United States Patent [19]
Butherus

[11] 3,765,949
[45] Oct. 16, 1973

[54] SOLID ELECTROLYTE BATTERIES AND METHODS FOR THEIR PRODUCTION

[75] Inventor: Alexander Duane Butherus, Murray Hill, N.J.

[73] Assignee: Bell Telephone Laboratories Incorporated, Murray Hill, N.J.

[22] Filed: Aug. 2, 1971

[21] Appl. No.: 168,066

[52] U.S. Cl. ............................................... 136/153
[51] Int. Cl. ........................................... H01m 11/00
[58] Field of Search....................... 136/83, 153, 148; 423/23, 46, 463, 472

[56] References Cited
UNITED STATES PATENTS

| | | | |
|---|---|---|---|
| 3,443,997 | 5/1969 | Argue et al. | 136/153 |
| 3,519,404 | 7/1970 | Argue et al. | 423/463 |
| 3,661,647 | 5/1972 | Owens et al. | 136/153 |
| 3,663,299 | 5/1972 | Owens et al. | 136/83 R |

Primary Examiner—A. B. Curtis
Assistant Examiner—H. A. Feeley
Attorney—W. L. Keefauver

[57] ABSTRACT

Solid electrolyte of the family exemplified by $RbAg_4I_5$ are used to form cells with silver-containing anodes and iodine-containing cathodes. The electrolytes are deposited from solution in which the solvent is an oxygen containing substituted hydrocarbon such as one of the ketones, alcohols or ethers. The electrolytes are produced in essentially pure form by a novel method involving the addition of certain other iodide compounds to the solution.

14 Claims, 5 Drawing Figures

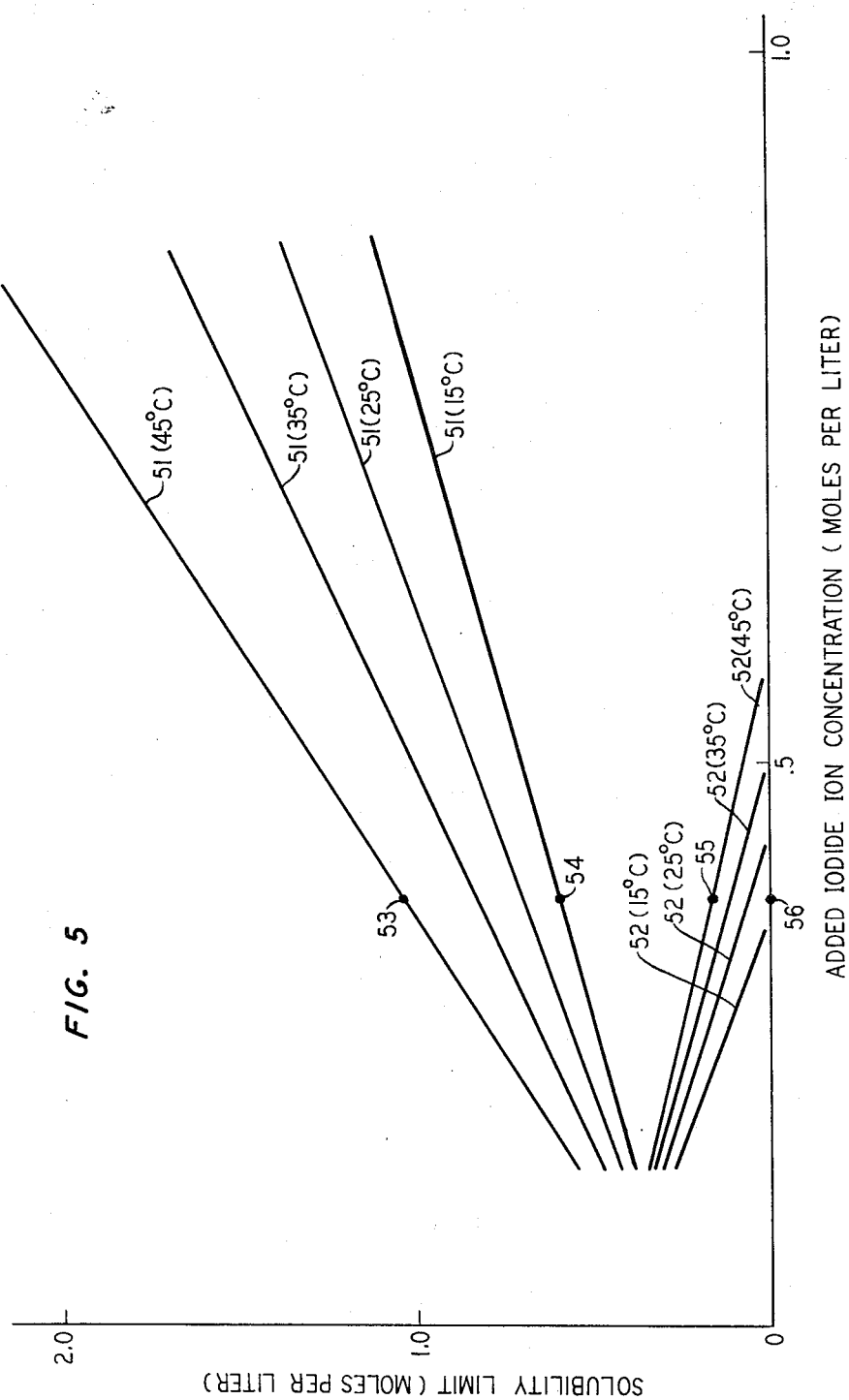

SOLID ELECTROLYTE BATTERIES AND METHODS FOR THEIR PRODUCTION

BACKGROUND OF THE INVENTION

1. Field of the Invention

The production of solid electrolyte cells.

2. Description of the Prior Art

Compounds of the class $MAg_4I_5$ (M = K, Rb or $NH_4$) were recently found to be solid electrolyte (J. N. Bradley et al., Transactions of the Faraday Society, 62, 2069 [1966]; 63, 424 [1967]). They produced these compounds by melting together stoichiometric amounts of the constituent iodide salts and quenching the melt. The electrolytes thus produced were nearly as conductive as common electrolyte solutions, the conductivity of $RbAg_4I_5$ being reported as 0.25 $(\Omega\text{-cm})^{-1}$. Such electrolytes have been used to make solid primary cells and batteries that are mechanically rugged and can be kept in their charged state for long periods of time with minimal degradation (G. R. Argue et al., Proceedings of the 6th International Power Source Symposium, Pergamon Press [1968] page 241). The construction of secondary cells of limited recycling capabilities (four times) employing melt-quench $RbAg_4I_5$ has more recently been reported (De Rossi et al., Journal of the Electrochemical Society, 116, page 1942 [1969]).

The production of this class of materials from solution has been considered to be a highly desirable alternative to the melt-quench process. From solution, powders, single crystals and thin layer deposits could be easily produced. However, little success has been reported in attempts to accomplish this. Early work reported the production of compounds of the class MI:2-(AgI) and MI:3(AgI) from acetone solution (March et al., Journal of the Chemical Soiciey, 103, 781 [1913]). These are poorly conducting compounds which are silver-deficient relative to the desired compounds, MI:-4AgI ($MAg_4I_5$).

Most recently $RbAg_4I_5$ in an impure form has been produced from acetone solution of the constituent salts by B. Scrosati (Journal of the Electrochemical Society, 118, [1971] 899 ). Scrosati reported that the compounds thus produced showed spurious X-ray lines and had a conductivity of only 0.1 $(\Omega\text{-cm})^{-1}$ (2 ½ times less than reported for the pure compound). Materials produced by Scrosati's method have been found to contain substantial amounts of the non-conducting phase, $Rb_2AgI_3$.

SUMMARY OF THE INVENTION

It has been found that solid electrolytes of the class $MAg_4I_5$ (M = Rb, K or $NH_4$ ) can be deposited in essentially pure form from solution in certain substituted hydrocarbon solvents. The novel method disclosed here involves the addition of iodide ions to the solution in greater than the stoichiometric amounts through the addition of iodide compounds other than the nutrients. For instance, essentially stoichiometric $RbAg_4I_5$ has been produced from an acetone solution of stoichiometric amounts (1:4 ) of the Rb and Ag iodide salts with the addition of HI to the solution. This compound was produced both by the evaporation of the solution to dryness and by the reduction of the temperature of a saturated solution between two predetermined temperatures. In both cases the resulting compound was shown to be essentially pure by differential thermal analysis and to posses a conductivity of $0.25\pm0.03$ $(\Omega\text{-cm})^{-1}$. Cells constructed using this material exhibit lower internal resistance and have been recharged many more times than cells similarily constructed, using the impure materials produced from solution in the absence of additional iodide ions. Both methods can be used to produce the electrolyte in the form of single crystals, crystalline powders and thin layer deposit. Cells using these materials have been made with metallic silver anodes and iodine containing cathodes. The charge-discharge cycle performance of these cells is greatly improved over the performance of similar cells using the impure electrolyte deposited from solution in the absence of additional iodide ions. Such cells have been produced using electrolyte in the form of pressed powders and using thin layers of electrolyte deposited directly from solution on a silver anode sheet. Another useful technique, which permits the deposition of thin films of silver in good contact with a film of deposited electrolyte and also minimizes the amount of silver required to form the cell involves the deposition of the electrolyte on a nonsilver anode sheet and the electrolytic formation of silver at the anode-electrolyte interface after deposition of the electrolyte. This can be done in situ in the deposition solution.

BRIEF DESCRIPTION OF THE DRAWING

FIG. 5 is a set of curves depicting the solubility limits of RbI and AgI as a function of temperature and added iodide ion concentration.

DETAILED DESCRIPTION OF THE INVENTION

Battery Chemistry

Figure 1:
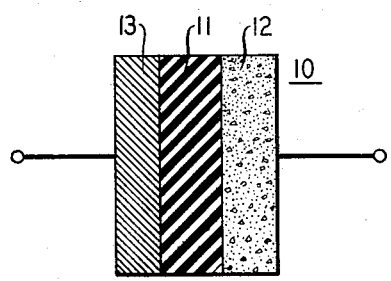
FIG. 1 is a sectional view of an exemplary solid electrolyte cell employing electrolyte produced by the disclosed method.

Solid electrolyte cells (see FIG. 1) depend for their operation on the migration of ions through the crystal lattice of the solid electrolyte 11. The solid electrolyte considered here has a general formula $MAg_4I_5$. The members of this family most useful in this connection are $KAg_4I_5$ $RbAg_4I_5$ and $NH_4Ag_4I_5$. In these materials the migrating ion is the silver ion, $[Ag^+]$. The cell reaction involves the ionization of silver atoms at the anode, the migration of silver ions through the electrolyte 11 and the chemical reaction of silver ions at the cathode 12. This requires that the anode 13 contain metallic silver or silver in a loosely combined form and that the cathode 12 contain some substance which will chemically react with silver ions. Of the many possible cathode materials, iodine, in the past, has proven most useful and is promising for future use. The physical advantages of a solid electrolyte battery in mechanical integrity and long shelf life are most fully realized when the cathode 12 is also solid. Due to its volatility it is desirable to have the iodine present in some chemically combined or complexed form. The cathode material chosen for exemplary use here is of the general form $MI_3$ (where M is usually the same substance as is present in the solid electrolyte). This compound breaks down easily into $MI + I_2$ liberating iodine for reaction with the silver ions. The open circuit voltage of battery 10 with a metallic silver anode 13, a solid electrolyte 11 allowing the migration of silver ions, and an iodine containing cathode 12 is approximately 0.68 volts.

Solution Chemistry

The solid electrolytes considered here are members of the family of compounds of the general form $(MI)_n \cdot (AgI)_m$. The member considered here with the $n = 1$ and $m = 4$ has an electric conductivity comparable to common liquid electrolytes. The other members of this family are relatively poorly conducting. Previous attempts to deposit this most highly conducting member of the family from solution have, as set forth above, led to the production of a rather poorly conducting electrolyte. It is believed that this is due at least in part to the coproduction of the nonconducting family member $M_2AgI_3$. Substantial amounts of $Rb_2AgI_3$ have, indeed, been found in samples of electrolyte deposited by the prior art process. In addition to decreasing the conducitivity of the electrolyte, the presence of this member greatly increases the rate of degradation of the electrolyte on recharge, thereby decreasing battery life. The invention, here lies primarily in the use of a method by which coproduction of such non-conducting famly members is suppressed.

Certain oxygen containing substituted hydrocarbons, such as the ketones, alcohols, and ethers, dissolve both AgI and salts of the class MI (M = Rb, K, or $NH_4$). However, they dissolve AgI in an amount less than the amount necessary to produce stoichiometric $MAg_4I_5$. The inventive method, here, includes the addition of iodide ions to the solution to decrease the solubility limit of MI and increase the solubility limit of AgI in the solution. The concentration of added iodide ions is selected such that the $MAg_4I_5$ deposited from solution is essentially stoichiometric. The desired compound can be precipitated by a constant temperature method such as by evaporation of the solution (either partially or to dryness) or by the reduction of the temperature of a saturated solution. The behavior of such solutions is illustrated in FIG. 5 which shows the solubility limits of a solution of RbI and AgI in acetone as a function of added iodide ion concentration at several different temperature. The behavior shown is characteristic of all solvents of the above groups which have been tried. Among these solvents are acetone, methyl ethyl ketone, dimethyl sulfoxide and tetrahydrofuran, ethyl alcohol and methyl alcohol. Curves 51 show that the solubility limit of silver iodide increases with added iodide ion concentration and increases with temperature while curves 52 show that the solubility limit of rubidium iodide decreases with added ion concentration and increases with temperature.

There are generally, two ways of causing the production of the electrolyte. The electrolyte can be produced by a constant temperature method such as evaporation of the solvent or addition of nutrient salts or by reduction of the temperature of a saturated solution. In either case, the added iodide ions must be introduced in such a way as not to be significantly included in the precipitated electrolyte. This is done through the introduction into the solution of HI, which is a gas, or an iodide compound such as NaI or LiI, which is more than ten times as soluble as MI and remains in solution while the desired electrolyte precipitates. When HI is used, the solution can be evaporated to dryness, the HI coming off as a gas.

Figure 2:
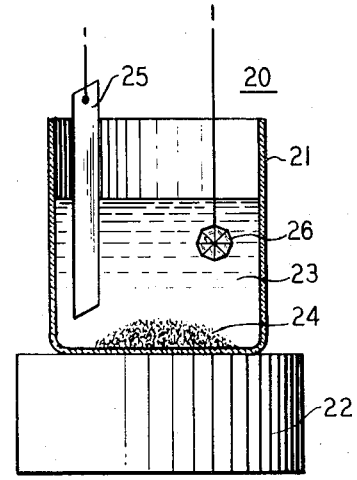
FIG. 2 is an elevational view partially in section of an exemplary electrolyte production apparatus.

FIG. 2 shows a solid electrolyte production apparatus including tank 21 and a temperature controller 22, The solid electrolyte is shown depositing from solution 23, as small crystallites 24, as a layer directly on a conducting plate or wire fabric 25 or as a massive crystal 26. Any of these forms can be produced by the evaporation or the temperature reduction method.

Figure 4:
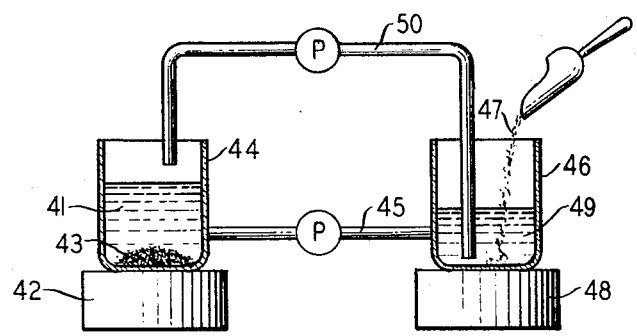
FIG. 4 is an elevational view in section of an exemplary electrolyte producing apparatus.

Knowledge of the solubility limits of MI and AgI as a function of temperature permits production of the electrolyte by the reduction of the temperature of a saturated solution. This information is shown in FIG. 5 for the RbI—AgI-acetone system. An exemplary procedure consists of the examination of a set of curves such as curves 51 and 52 for the particular system being employed and the selection of an upper temperature, a lower temperature and an added iodide ion concentration such that the difference between the upper 53 and the lower 54 AgI solubility limit is four times as great as the difference between the upper 55 and the lower 56 solubility limit for RbI. After the electrolyte has come out of solution at the lower temperature the cooled and partially depleted solution can be recycled in an apparatus such as is illustrated in FIG. 4. Here the solution 41, originally saturated at the preselected upper temperature is cooled to the preselected lower temperature in a manner controlled by the temperature control apparatus 42. During this temperature reduction a quantity of electrolyte 43 comes out of solution and falls to the bottom of the container 44. The cooled liquid is them pumped through the connecting tube 45 into a second container 46 where nutrient materials 47 are added and the temperature of the solution brought back to the upper temperature by the temperature control apparatus 48. Any iodide ion addition required for stoichiometry control is done at this time. When the container 44 is drained, the electrolyte 43 which has been precipitated, is removed and the cycle is continued by pumping the replenished solution 49 into the precipitation container 44 through the tube 50. Either HI or one of the highly solubility iodide salts described above is suitable for use in providing the additional iodide ions necessary to control the stoichiometry of the solid electrolyte 43 formed by this temperature reduction procedure.

EXAMPLES

In he following examples of solid electrolyte production, the Rb-containing member of the family has been selected as being representative. This member is easiest to work with since it is the most stable against moisture. In suitably dry conditions the other members are similarly operative. Electrolytes produced by the methods of the following examples possessed electrical conductivities of $0.25 \pm 0.03$ $(\Omega\text{-cm})^{-1}$.

EXAMPLE 1

1. 3.12 gm of RbI were dissolved in 500 ml of acetone in a stirred flask at 20°C. This was a saturated solution;

2. 13.8 gm of AgI were added and HI slowly bubbled through the solution, while constantly stirring, until the AgI just dissolved;

3. The solution was evaporated to dryness yielding $RbAg_4I_5$ of more than 95 percent purity as measured by differential thermal analysis and X-ray analysis.

EXAMPLE 2

The above procedure was repeated using tetrahydrofuran a cyclic as a solvent.

EXAMPLE 3

1. 3.21 gm of RbI were dissolved in 500 ml of acetone in a stirred flask at 45°C;
2. 14.25 gm of AgI were added and HI slowly bubbled through the solution, while constantly stirring until the AgI just dissolved;
3. The temperature of the solution was reduced to 15°C over a period of approximately 5 minutes, during which time solid particles formed within the solution and as a layer on the sides of the container;
4. The liquid was decanted and the solids collected and dried; and
5. The solids were $RbAg_4 I_5$ of more than 94 percent purity.

EXAMPLE 4

1. 3.21 gm of RbI were dissolved in 500 ml of acetone in a stirred flask at 45°C;
2. 14.25 gm of AgI were added and NaI slowly added while constantly stirring until the AgI just dissolved;
3. The temperature of the solution was reduced to 15°C over a period of approximately 5 minutes, during which time solid particles formed within the solution and as a layer on the sides of the container;
4. The liquid was decanted and the solids collected and dried; and
5. The solids were $RbAg_4 I_5$ of more than 93 percent purity.

BATTERY CONSTRUCTION

The silver ions required for battery 10 operation are supplied at the anode 13 by metallic silver. Powdered silver, fabrics incorporating fine silver wire and silver sheets have been employed as silver containing battery anodes 13. When the electrolyte 11 is formed as small crystallites, the powdered silver anode 13 is preferred in order to achieve good electrical contact between the anode 13 and the electrolyte 11. This contact is achieved by pressing the electrolyte 11 against the silver powder during the construction of the battery 10. Production of the electrolyte from solution allows good contact to be attained more easily by direct deposition of the electrolyte 11 onto the anode structure 13.

Figure 3:
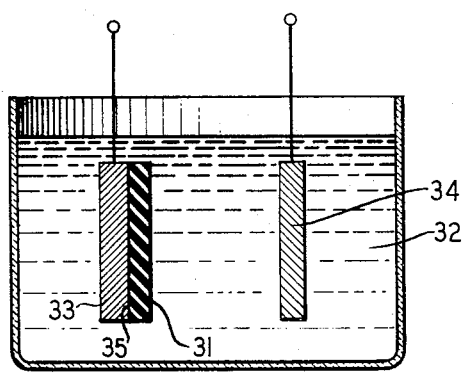
FIG. 3 is an elevational view in section of an exemplary electrolyte production apparatus including means for electrolytically forming silver at the electrode-electrolyte interface.

An alternative to the use of silver to form the anode structure is the use of a less expensive metal, such as copper, and the electrolytic deposition of silver on the anode after the solid electrolyte is joined to the anode (see FIG. 3). This can be accomplished, for example, by first depositing the electrolyte 31 from solution 32 directly on the copper sheet or fabric anode structure 33. Then the copper is cathodically biased, using an auxiliary electrode 34 to a large enough potential to cause electrolytic deposition of silver from electrolyte deposition solution 32 at the electrolyte-copper interface 35. This results in a saving of silver, since only enough silver need be used to provide the planned battery storage capacity. The structural characteristics of the anode are provided by the copper.

Of the many chemical reactions involving silver which can be used to provide the battery cathode reaction, the reaction of silver with iodine to form silver iodide is most compatible with the chemistry of the electrolyte. In that case the cathode 12 must contain free iodine or an iodine compound or complex which will readily release iodine. One such class of compounds, useful in conjunction with the disclosed solid electrolyte, is $MI_3$. Here M is preferably the same constituent as is present in the solid electrolyte $MAg_4 I_5$. Compounds of the class $MI_3$ however, are poor conductors and some means must be employed to increase the conductivity of the cathode 12. One such means which has been employed is the incorporation of powdered graphite and electrolyte mixed together with the powdered $MI_3$ and pressed together with the anode 13 and electrolyte 11 during the construction of the battery 10.

The following are exemplary of the batteries which have been constructed by the disclosed process.

EXAMPLE 5

A three-layer pellet 0.500 diameter was pressed. 0.50 gm of Ag powder constituted the anode, 0.523 gm of $RbAg_4 I_5$ crystallized from an acetone — HI solution saturated with AgI and RbI constituted the electrolyte, and 0.352 gm of a 1:1:2 mixture by weight of $RbI_3$ carbon and $RbAg_4 I_5$ constituted the cathode. The cell was discharged at 0.75 ma until the terminal voltage reached 0.4 volts, a voltage reached in 10.4 hours for a total discharge of 7.8 ma hours. The interfaces were essentially planar, so this corresponded to a reaction depth of $243\mu$ in the silver electrode and a cathode utilization of 14.8 percent.

EXAMPLE 6

A three-layer pellet of 0.500 diameter was pressed. 0.492 gm Ag powder constituted the anode, 0.541 gm of $RbAg_4 I_5$ crystallized from an acetone — HI solution saturated over AgI and RbI constituted the electrolyte, and 0.304 gm of 1:1:2 mixture by weight of $RbI_3$ C and $RbAg_4 I_5$ respectively constituted the cathode. The cell was cycled in 3 hours charge/discharge cycles at 0.75 ma (equivalent to a $72.6\mu$ reaction depth in the Ag. The cell gave over 43 charge/discharge cycles before the terminal voltage on discharge fell below 0.4 volts.

EXAMPLE 7

$RbAg_4 I_5$ from an acetone HI solution of RbI and AgI was evaporated on one surface of Ag disk 0.500 inch diameter and 0.032 inch thick. 0.377 gm of a mixture of $RbI_3$ carbon, and $RbAg_4 I_5$ in 1:1:2 weight ratio was pressed onto the $RbAg_4 I_5$ layer forming the cathode. The cell was discharged at 0.75 ma to a terminal voltage of 0.4 volt, which was reached in 9.9 hours.

EXAMPLE 8

A three-layer pellet of 0.500 inch diameter was pressed. 0.483 g of Ag powder constituted the anode, 0.502 g of $RbAg_4 I_5$ crystallized from an acetone-HI solution saturated with AgI and RbI constituted the electrolytic, and 0.376 g of a 1:1:2 mixture by weight of $RbI_3$ carbon, and $RbAg_4 I_5$ constituted the cathode. The cell was charged and discharged at 0.75 ma in a 4 minute charge-discharge schedule for over 2,800 cycles with the terminal voltage on discharge not falling to 0.4 volt.

EXAMPLE 9

A three-layer sandwich was constructed. A 0.001 inch thick Ag foil disk of 0.500 inch diameter constituted the anode, a 0.0005 inch thick $RbAg_4I_5$ layer deposited on the Ag foil from an acetone-HI solution saturated with AgI and RbI constituted the electrolyte, and a 0.005 inch thick 0.500 inch diameter pressed pellet of a 1:1:2 mixture by weight of $RbI_3$, carbon, and $RbAg_4I_5$ constituted the cathode. The cell was charged and discharged at 0.75 ma in a 4 minute charge-discharge cycle regime for a total of more than 117 cycles before the terminal voltage on discharge fell to 0.4 volt.

What is claimed is:

1. A method for the production of solid electrolyte cell comprising contacting an anode and a cathode to an electrolyte body composed essentially of $MAg_4I_5$, where M is at least one member selected from the group consisting of K, Rb and $NH_4$, characterized in that the $MAg_4I_5$ is formed in situ directly onto the anode from a solution comprising a solvent, MI, AgI and XI wherein X is an ionic species other than M and Ag and wherein the solvent is selected such that its molar solubility limit for MI is at least 10 times its molar solubility limit for AgI, and wherein XI is included in a concentration, greater than 0.1 moles per liter of the solvent, such that Ag and M, are present in the electrolyte body in a molar ratio of essentially 4:1, said $MAg_4I_5$ body has a purity in excess of about 93%.

2. A method of claim 1 in which the anode is externally biased after the electrolyte body is deposited so as to cause the deposition of silver on the electrolyte body where the electrolyte body is in contact with the anode.

3. A method of claim 1 in which M is Rb.

4. A method of claim 1 in which the solvent is composed of at least one member selected from the group consisting of ketones, alcohols and ethers.

5. A method of claim 4 in which the solvent is composed of at least one member selected from the group consisting of acetone, methyl ethyl ketone, dimethyl sulfoxide, tetrahydrofuran, ethyl alcohol and methyl alcohol.

6. A method of claim 5 in which the solvent is acetone.

7. A method of claim 4 in which X is a member selected from the group consisting of H and those elements for which the solvent has a molar solubility limit for XI at least 10 times its molar solubility limit for MI.

8. A method of claim 7 in which X is a member selected from the group consisting of H, Na and Li.

9. A method of claim 7 in which the $MAg_4I_5$ is crystalized from the solution by reducing the temperature of the solution from an upper temperature to a lower temperature where the solution is saturated with MI and AgI at the upper temperature, and the upper temperature and the lower temperature are chosen such that the molar ratio of AgI and MI crystalized from the solution, as the temperature of the solution is reduced, is essentially 4:1.

10. A method of claim 7 in which the $MAg_4I_5$ is crystalized from the solution at essentially constant temperature.

11. A method of claim 10 in which the solution contains Ag and M in a molar of 4:1 and the $MAg_4I_5$ is formed from the solution by evaporating at least a portion of the solvent.

12. A method of claim 1 in which the cathode contains an iodide compound.

13. A method of claim 12 in which the iodide compound is $RbI_3$.

14. A solid electrolyte cell produced by the method of claim 1.

* * * * *

UNITED STATES PATENT OFFICE
CERTIFICATE OF CORRECTION

Patent No. 3,765,949            Dated October 16, 1973

Inventor(s) Alexander D. Butherus

It is certified that error appears in the above-identified patent and that said Letters Patent are hereby corrected as shown below:

Column 1, line 70, delete "-" before "0.25".
Column 3, line 55, after "added" insert --iodide--.
Column 4, line 4, after "including" insert --a deposition--.
Column 4, line 32, delete "them" and insert --then--.
Column 4, line 50, delete "he" and insert --the--.

Signed and sealed this 5th day of March 1974.

(SEAL)
Attest:

EDWARD M. FLETCHER, JR.       C. MARSHALL DANN
Attesting Officer               Commissioner of Patents